Nov. 4, 1941.   S. SCHNELL   2,261,415
WASHER
Filed May 31, 1940
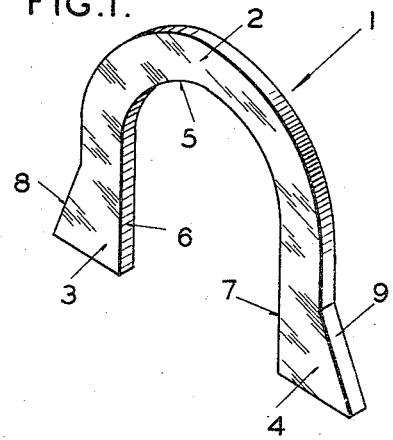
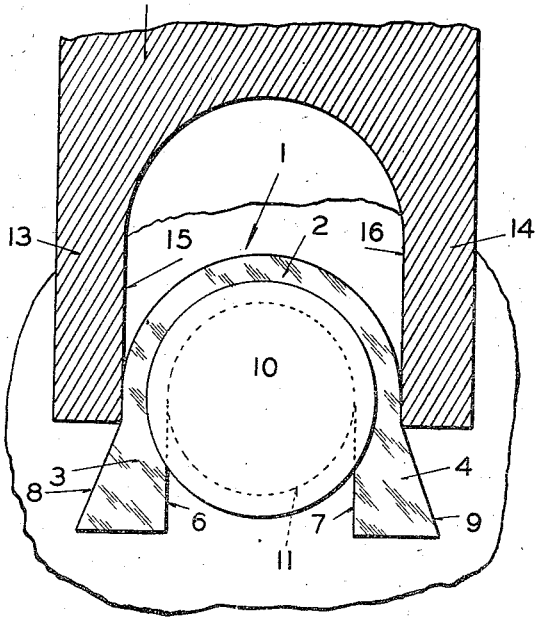
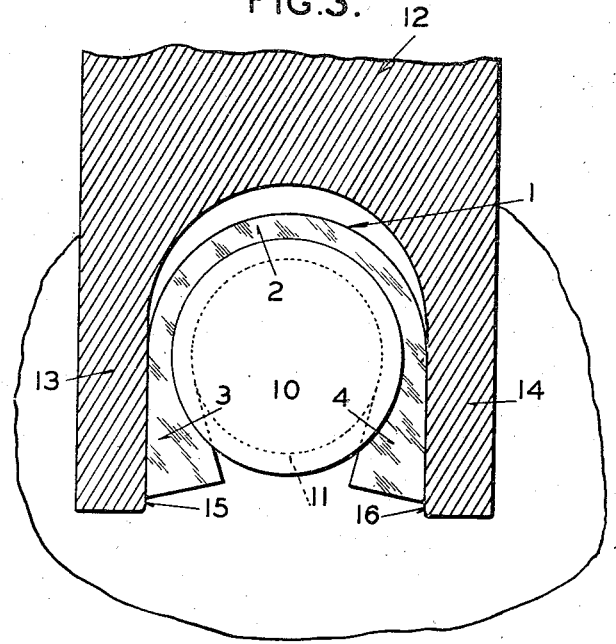
INVENTOR
STEVE SCHNELL
BY
ATTORNEY Patented Nov. 4, 1941

2,261,415

UNITED STATES PATENT OFFICE 2,261,415

WASHER

Steve Schnell, Overland, Mo., assignor to Wagner Electric Corporation, St. Louis, Mo., a corporation of Delaware Application May 31, 1940, Serial No. 338,144

4 Claims. (Cl. 85—51)

My invention relates to locking means and more particularly to a locking washer for cooperation with a groove on a shaft, pin or other member.

Among the objects of my invention are to produce an improved locking washer of the "C" type which can be cheaply manufactured, easily installed by a simple tool so as to surround and grip the base of the groove in the member upon which it is positioned, and also readily removed when necessary.

Other objects will become apparent from the following description taken in connection with the accompanying drawing in which Figure 1 is a perspective view of the improved washer; Figure 2 is a view showing the washer in position prior to being deformed by a suitable tool, and Figure 3 is a view similar to Figure 2 showing the washer installed.

Referring to the drawing in detail and particularly to Figure 1, the washer 1 is of general U-shape having a base portion 2 and legs 3 and 4. The inner edge 5 of the base portion is semicircular and the inner edges 6 and 7 of the legs form extensions of the edge 5. The edges 6 and 7 are parallel with each other and spaced apart the same distance as the diameter of the circle of which the edge 5 is a part. The outer edges 8 and 9 of the legs adjacent their ends are flared so as to be at an acute angle to the inner edges 6 and 7, thus making the ends of the legs somewhat wedge-shaped. The washer is stamped out of sheet metal to the form shown in Figure 1, the metal being deformable under pressure.

In Figures 2 and 3 I have shown how my washer may be installed on a grooved pin or shaft to hold a member in position on said pin or shaft or hold said pin or shaft from longitudinal movement relative to a fixed member. The pin or shaft 10 is provided with an annular groove 11, the bottom surface of which has the same radius of curvature as the semi-circular edge 5 of the washer. The tool 12 for installing the washer is shown as one in which there is provided a U shaped cut-out forming legs 13 and 14 having parallel surfaces 15 and 16, the distance between which is equal to the distance between the outer edges of the legs of the "C" washer at a point just rearwardly of the flared edges 8 and 9.

To install the washer it is positioned in the groove, then the tool 12 is positioned so that the U shaped cut-out receives the base portion 2. Force is now applied to the tool to move the legs 13 and 14 forwardly and cause them to deform the ends 3 and 4 of the legs of the washer inwardly toward each other by acting on the flared edges 8 and 9. As the tool is moved forwardly to a point where the ends of the legs 13 and 14 thereof reach the ends of the legs of the washer the edges 8 and 9 will be caused to be parallel with each other and the inner edges of the ends of the legs of the washer will be deformed and forced into the groove 11 as shown in Figure 3. The washer will now be wrapped around the base of the groove of the shaft and will be maintained in operative position since the distance between the ends of the legs is considerably less than the diameter of the bottom of the groove. During installation the base portion 2 of the washer will be held in engagement with the bottom of the groove since the legs of the tool acting on the surface 8 and 9 produce a force acting in the proper direction. The construction of the washer and the method of installation insures that the washer will tightly grip the base surface of the groove over substantially two hundred and forty degrees.

When it is desired to remove the washer a force can be applied to both ends of the legs of the washer by a suitable tool and in a direction toward the pin or shaft, thus spreading the legs back into their original position as the washer is forced out of the groove.

Being aware of the possibility of modification in the particular structure herein described without departing from the fundamental principles of my invention, I do not intend that its scope be limited except as set forth by the appended claims.

Having fully described my invention, what I claim as new and desire to secure by Letters Patent of the United States is:

1. A locking washer for cooperation with a pin, shaft or like element comprising a generally U-shaped flat member of deformable material having a semi-circular base portion and forwardly extending legs, the inner radius of said base being substantially the same as the portion of the element said washer is to surround and the ends of said legs being wedge-shaped with the inner edges thereof parallel and the outer edges diverging in the direction of the ends of the legs, whereby the washer may be attached to the element by simultaneously deforming the legs only and in such a manner that the outer edges are caused to be substantially parallel.

2. A locking washer for cooperation with a pin, shaft or like element comprising a generally U-shaped flat member of deformable material having a semi-circular base portion and forwardly extending legs, the inner radius of said base being substantially the same as the portion of the element said washer is to surround and the inner edges of the legs being parallel and tangent to the inner semi-circular edge of the base portion and the outer edges of the legs adjacent their ends being provided with surfaces which when acted upon by fixed spaced apart portions of a tool after said washer is placed on the portion of the element so that the base portion engages the portion of the element the washer is to surround and as a result of said tool being moved from the base portion toward the ends of the legs, will cause the ends of the legs only to be deformed and moved toward each other.

3. A locking washer for cooperation with a pin, shaft or like element comprising a generally U-shaped flat member of deformable material having the inner edge of its base portion semi-circular with a radius substantially the same as the radius of the portion of the element which it is adapted to surround, the inner edges of said legs parallel with each other, and the width of said legs greater adjacent the ends thereof than adjacent the base portion, whereby when the washer is placed on the portion of the element so that the base portion engages the portion of the element the washer is to surround the ends only of the legs may be forced inwardly toward each other and around the element by fixed spaced apart portions on a tool by moving the portions of said tool in a direction from the base portion toward the ends of the legs.

4. A locking washer for cooperation with a pin, shaft or like element comprising a generally U-shaped flat member of deformable material having the inner edge of its base portion semi-circular with a radius substantially the same as the radius of the portion of the element with which it is adapted to cooperate, the inner edges of said legs parallel, and the outer edges of said legs diverging toward the ends of the legs from points adjacent the base portion, whereby when the washer is placed on the portion of the element so that the base portion engages the portion of the element the washer is to surround the ends only of the legs may be forced inwardly toward each other by fixed spaced apart portions of a tool cooperating with the diverging edges and causing said diverging edges to become substantially parallel.

STEVE SCHNELL.